(No Model.)  3 Sheets—Sheet 1.

J. H. TROWBRIDGE.
MACHINE FOR GATHERING AND RUFFLING FABRICS.

No. 323,544. Patented Aug. 4, 1885.

WITNESSES.
Joseph McCrane
Manuel M. Cooke

INVENTOR.
John H. Trowbridge
by
his Attorney (No Model.) 3 Sheets—Sheet 2.
J. H. TROWBRIDGE.
MACHINE FOR GATHERING AND RUFFLING FABRICS.
No. 323,544. Patented Aug. 4, 1885.
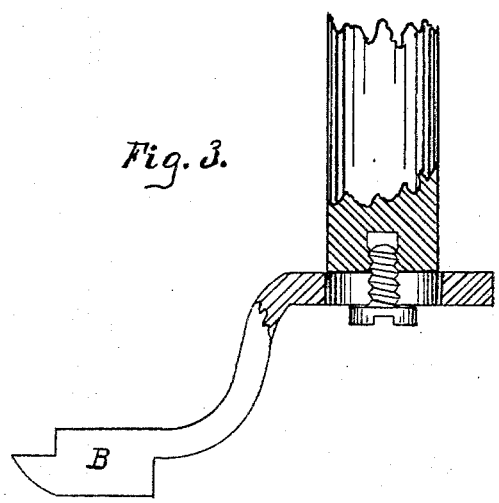
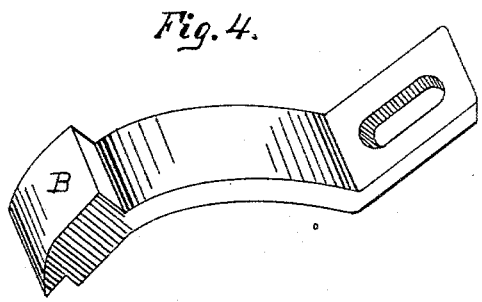
WITNESSES.
INVENTOR.

(No Model.) 3 Sheets—Sheet 3.

J. H. TROWBRIDGE.
MACHINE FOR GATHERING AND RUFFLING FABRICS.

No. 323,544. Patented Aug. 4, 1885.

United States Patent Office.

JOHN H. TROWBRIDGE, OF NEW YORK, N. Y.

MACHINE FOR GATHERING AND RUFFLING FABRICS.

SPECIFICATION forming part of Letters Patent No. 323,544, dated August 4, 1885.

Application filed August 25, 1880. (No model.)

*To all whom it may concern:*

Be it known that I, JOHN H. TROWBRIDGE, a citizen of the United States, residing in the city, county, and State of New York, have invented a new and useful Improvement in Machines for Gathering and Ruffling Fabrics, of which the following is a specification.

My invention consists in adapting the ordinary sewing-machine to the formation of gathers and ruffles, which I accomplish by removing a portion of the teeth from the ordinary feed-dog and applying a suitable device to the presser-bar to operate in combination with said feed-dog, acting in such a manner as to produce gathers and ruffles of different widths.

Figure 1:
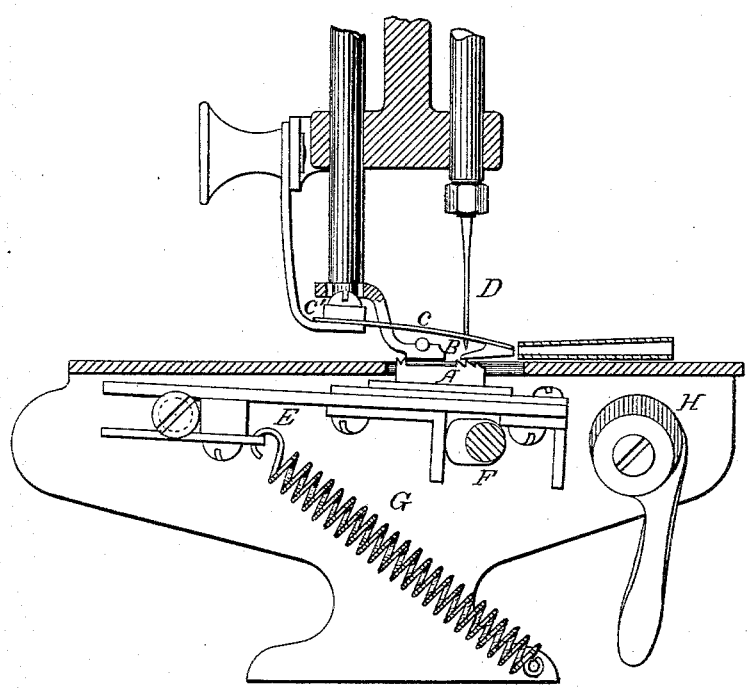
Figure 2:
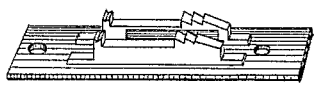
Figure 5:
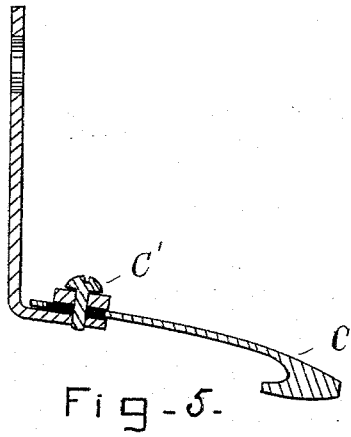
Figure 6:
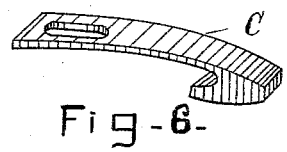

In the drawings, Figure 1 represents an elevation of a sewing-machine of the class known as the "Willcox & Gibbs" style, shown in section cut through in line with the center of the needle, showing all of the essential or operative parts in position. Fig. 2 represents the serrated part of the feed-dog with the center portion of its teeth removed, which serves the double purpose of feed and gatherer. Figs. 3 and 4 represent an enlarged view of a slotted presser or smoother and a section of a presser-bar with screw for adjusting. Fig. 5 represents a section of the separator or supplemental presser and the arm to which the separator is attached, showing slot and means for adjustment. Fig. 6 represents a perspective view of the separator or supplemental presser detached, showing its slot.

A is the ordinary feed-dog of the sewing-machine, with the middle portion of the teeth cut away or removed in such a manner as to leave a smooth surface below and between the projecting teeth, substantially as shown in Fig. 2 of the drawings.

B represents the presser-foot adapted to fall into the space provided for it in the feed-dog, which presser-foot is capable of adjustment, being slotted for that purpose and held by a screw, (a suitable means being shown in Fig. 3 of the drawings,) for the purpose of aiding in varying the fullness or width of the gathers or folds of the fabric operated upon.

C is a device which serves as a supplemental presser and smoother, which also aids in preventing the drawing back of the goods in the retreat of the feed after a gather has been formed by its forward motion. This also is adjustable by means of a screw through the medium of an elongated slot, as shown in Figs. 3 and 4, in order to accommodate its position to that of the feed-dog, with which it acts in conjunction.

C' represents an adjusting-screw for changing the position of the supplemental presser and smoother at the pleasure of the operator.

D is the needle, which, with its connecting mechanism, performs the stitching.

E represents the ordinary carrier, to which the rough-surface feed-dog is secured, and by which it is operated, which is the same as adopted and used in the old and well-known Willcox & Gibbs sewing-machine.

F is the cam upon the end of a revolving shaft for operating or moving the feed as desired, which is the same as adopted in the said Willcox & Gibbs machine before referred to.

G and H represent a coiled spring and adjusting cam-lever, respectively, which are old, and which are employed to act in connection with the feed, for which I claim nothing new.

The operation of my improved gathering-machine is as follows: The feed-dog is adjusted for any length of stitch desired. In practice the presser-foot B is adjusted by the loosening of the screw C'' and moving it by reason of its slot (see Fig. 4) either toward or from the seat of the operator in such a manner as to allow the foot to fall into the space between the teeth or serrations, and so hold or detain the moving fabric at a point that when the feed-dog has advanced the strip operated upon to the front edge of the presser-foot B a fold or gather is formed and held by the supplemental presser and smoother C until the stitch is formed and while the feed is in motion. The supplemental presser and smoother C also serves as a separator to separate the band from the gather while the latter is being formed, in the event that such parts are desired to be united simultaneously by the machine. Thus, in forming a ruffle, I place the strip to be gathered under the supplemental presser and separator C and the presser-foot B, so that the action of the feed-dog is free to operate against the under side of the strip and move it along in the desired direction toward the needle, the adjustment of the presser-foot B being such that the feed-dog, in rising, lifts against the under side thereof, and so moves rearward, carrying the goods with it, until the foot drops off into the open space, where the blank or smooth part forming the space between the serrations slides along without carrying the fabric with it, while the fold is being formed by the serrated part moving the fabric forward and toward the end of the presser-foot B, as before stated. The band, when desired to be secured to the ruffle, is placed over the top or foot part of the supplemental presser and separator or smoother C, and so on under the presser-foot proper, for the action of the needle upon it. The variation of the widths of folds or gathers formed is produced by adjusting the presser-foot forward toward the operator for narrow or fine gathers and away for wider, and for this purpose the foot-piece is slotted and held in position by means of a screw, (shown at C″ in Fig. 3,) to admit of the proper horizontal adjustment. The separator also is slotted at the junction of the parts, (indicated at C′,) which is usually adjusted at the same time that the adjustment of the presser-foot B is effected.

I have represented my improvement as applied to the well-known Willcox & Gibbs sewing-machine for convenience, although it is equally applicable to other sewing-machines of styles and combination of parts different, which will be obvious to others skilled in the art.

The application of my improvement does not in the slightest degree interfere with the ordinary functions of the machine, merely changing the shortened presser-foot for the ordinary one, which is capable of spanning the space between the roughened surface or serrations with which the feed-dog is provided at each end thereof. It is not even necessary to remove the flexible or supplemental presser or separator, although it is preferable, in order to allow a better view of the action of the needle and the feeding of the material operated upon.

The object of my invention is to adapt the ordinary sewing-machine for the operation of producing gathers, plaits, or ruffles without the application of double or two separately-acting feeds, as in the Arnold patent of May 8, 1860, or without the application of attachments provided with gathering-blades, levers, &c., for operating the same.

Having thus set forth my invention, what I claim as new, and desire to secure by Letters Patent of the United States of America, is—

1. In a machine for ruffling, the combination, with a supplemental presser and a feed-dog provided with a roughened surface with the center thereof depressed or cut away, thereby forming a space, of a presser-foot adapted to rise and fall by the action of the said feed, whereby gathers or ruffles are formed, substantially as and for the purpose set forth.

2. In a machine for gathering and ruffling fabric, the combination, with a feeding device having a space or channeled way located about the center of its roughened surface, of a presser adapted to drop into said space, whereby the fabric is detained as the feed-dog is advancing, substantially as and for the purpose set forth.

JOHN H. TROWBRIDGE.

Witnesses:
JOHN DANE, Jr.,
MANUEL M. COOKE.